United States Patent [19]
Lemme et al.

[11] Patent Number: 6,036,988
[45] Date of Patent: Mar. 14, 2000

[54] METHOD AND APPARATUS FOR ROASTING COFFEE BEANS

[75] Inventors: Anthony R. Lemme, Wallingford; Chester Fudge, Middletown, both of Conn.

[73] Assignee: Source Intermarketing AG, Huttlingen, Switzerland

[21] Appl. No.: 09/227,777

[22] Filed: Jan. 8, 1999

[51] Int. Cl.$^7$ .............................. A23N 12/00; F26B 17/00
[52] U.S. Cl. ................. 426/466; 34/63; 34/596; 99/469; 99/474; 99/483; 426/467
[58] Field of Search ................... 426/466, 467, 426/520; 99/474, 476, 469, 483, 331; 34/63, 197, 211, 488, 596

[56] References Cited

U.S. PATENT DOCUMENTS

| | | |
|---|---|---|
| D. 87,997 | 10/1932 | Kelly . |
| D. 94,535 | 2/1935 | Bly et al. . |
| 366,106 | 7/1887 | Hungerford . |
| 1,629,943 | 5/1927 | Zeun . |
| 2,168,797 | 8/1939 | Havis . |
| 4,271,603 | 6/1981 | Moore, III . |
| 4,325,191 | 4/1982 | Kumagi et al. . |
| 4,494,314 | 1/1985 | Gell, Jr. . |
| 4,642,906 | 2/1987 | Kaatze et al. . |
| 4,683,666 | 8/1987 | Igusa et al. . |
| 4,691,447 | 9/1987 | Nakai et al. . |
| 4,860,461 | 8/1989 | Tamaki et al. . |
| 4,871,901 | 10/1989 | Igusa et al. . |
| 5,182,981 | 2/1993 | Wilcox . |
| 5,230,281 | 7/1993 | Wireman et al. ......................... 99/483 |
| 5,269,072 | 12/1993 | Waligorski . |
| 5,287,633 | 2/1994 | Sachs . |
| 5,359,788 | 11/1994 | Gell, Jr. . |
| 5,735,174 | 4/1998 | Cochran ................................... 99/483 |

FOREIGN PATENT DOCUMENTS

| | | |
|---|---|---|
| 60-180544 | 9/1985 | Japan . |
| 62-179343 | 8/1987 | Japan . |

*Primary Examiner*—George C. Yeung
*Attorney, Agent, or Firm*—DeLio & Peterson LLC

[57] ABSTRACT

A roasting apparatus for coffee beans comprises a housing and a horizontal drum on the housing rotatable about an axis with an opening on a first end thereof for receiving and discharging beans and a plurality of openings on a second end opposite the first end of size sufficient to pass air and insufficient to pass the beans. The apparatus includes a heater in the housing capable of heating the drum to roast the beans and a fan adapted to move air through the first and second ends of the drum. A pair of doors pivotally mounted on a common hinge between the fan and the drum are movable between a closed position during roasting substantially blocking passage of free flow of air through the drum and an open position permitting free flow of the air once the beans are sufficiently roasted. A chaff collector is secured to the housing at an end opposite the drum first end. The collector has a plurality of openings of size sufficient to pass air and insufficient to pass chaff from the beans. When the beans are sufficiently roasted, the fan moves air through-the opening in the first end of the drum and the open doors and cause chaff to be removed from the roasted beans or other food and carried with the air through the openings in the second end of the drum. The chaff is then collected within the chaff collector as the air passes through the openings therein.

23 Claims, 4 Drawing Sheets

METHOD AND APPARATUS FOR ROASTING COFFEE BEANS

BACKGROUND OF THE INVENTION

1. Field of the Invention

The present invention relates to an apparatus and method for roasting coffee and other beans and nuts.

2. Description of Related Art

Among recent devices disclosed for roasting coffee beans and other food products, Lemme et al. U.S. Pat. No. 5,638,607 provides facile loading, unloading and cleaning of the roasting drum, which makes it especially useful for roasting small quantities of beans in the home. The '607 patent further provides an efficient chaff collector which may be accessed and cleaned without interfering with the roasting process.

However, it has been found that the roasting/cooling process for coffee beans is particularly sensitive to air flow. Although natural convection currents always exist to some extent, it has been found to be important to be able to control air flow throughout he roasting apparatus during the heating and cooling process. Prior art devices, including the '607 patent, have not fully addressed this issue. Furthermore, the path and location of chaff collection with respect to the roasting drum and cooling fan has been found to important to optimize the process.

Bearing in mind the problems and deficiencies of the prior art, it is therefore an object of the present invention to provide an apparatus and method in which air flow is particularly controlled to optimize the heating/cooling process while roasting coffee beans.

It is another object of the present invention to optimize the path and location of chaff collection in a roasting apparatus.

It is a further object of the present invention to achieve the aforementioned objects in an apparatus which may be used in the home environment to roast small (0.5–2 lb.) quantities of coffee beans or other food items.

Yet another object of the present invention is to maintain easy loading, unloading and cleaning of the roasting apparatus while improving these parameters.

Still other objects and advantages of the invention will in part be obvious and will in part be apparent from the specification.

SUMMARY OF THE INVENTION

The above objects are achieved in the present invention which relates in one aspect to a roasting apparatus for coffee beans and other food comprising a housing and a drum on the housing rotatable about an axis, preferably horizontal. The drum has an opening on a first end thereof for receiving and discharging coffee beans or other food desired to be roasted and a plurality of openings on a second end opposite the first end of size sufficient to pass air and insufficient to pass the coffee beans or other food. The apparatus includes a heater in the housing capable of heating the drum to roast the coffee beans or other food and a fan adapted to move air through the first and second ends of the drum. Preferably, there is provided a door between the fan and the drum movable between a closed position substantially blocking passage of free flow of air to the drum and an open position permitting free flow of the air. The door is adapted to be in a closed position during roasting of the coffee beans or other food and in an open position once the coffee beans or other food are sufficiently roasted. A door actuator may be provided to retain the door in the closed position during roasting and thereafter move the door to the open position for flow of cooling air through the drum.

The apparatus also preferably further includes a chaff collector secured to the housing at an end opposite the drum first end, the collector having a plurality of openings of size sufficient to pass air and insufficient to pass chaff from the coffee beans or other food. When the coffee beans or other food are sufficiently roasted, the fan is adapted to move air through the opening in the first end of the drum and cause chaff to be removed from the roasted beans or other food and carried with the air through the openings in the second end of the drum. The chaff is then collected within the chaff collector as the air passes through the openings therein. When the drum axis is horizontal, the air and chaff are moved in a substantially horizontal direction through the apparatus. The chaff collector may be rotatably secured to the housing to vary direction of air passing through the openings therein. The chaff collector may also be detachably secured to the housing for removal and cleaning.

The roasting apparatus may further include a collection cup removably secured on the housing proximate the first end of the drum. The collection cup has a lip conforming to the configuration of the opening on the first end of the drum. The roasting apparatus may include a plurality of doors between the fan and the drum, for example a pair of doors pivotally mounted on a common hinge for movement between the closed and open positions. A removable drawer may be provided below the drum for collecting particles removed from the coffee beans or other food during roasting.

In another aspect, the present invention provides a method of roasting coffee beans or other food. The is first provided a drum rotatable about an axis and having an opening on a first end thereof for receiving and discharging coffee beans or other food desired to be roasted and a plurality of openings on a second end opposite the first end of size sufficient to pass air and insufficient to pass the coffee beans or other food. The method includes placing coffee beans or other food to be roasted in the drum, applying heat to the drum while restricting flow of air to the drum, except for any natural convection, to cause the coffee beans or other food to be roasted, and after the coffee beans or other food has been sufficiently roasted, flowing air through the drum to cool the coffee beans or other food and cause chaff to be removed therefrom.

In the method, cooling air is preferably flowed through the opening on the drum first end, causing chaff to be removed from the roasted beans or other food and carried with the air through the openings in the second end of the drum. Thereafter, the chaff is collected. The cooling air may be directed around the drum while restricting flow of air through the drum during roasting.

BRIEF DESCRIPTION OF THE DRAWINGS

The features of the invention believed to be novel and the elements characteristic of the invention are set forth with particularity in the appended claims. The figures are for illustration purposes only and are not drawn to scale. the invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
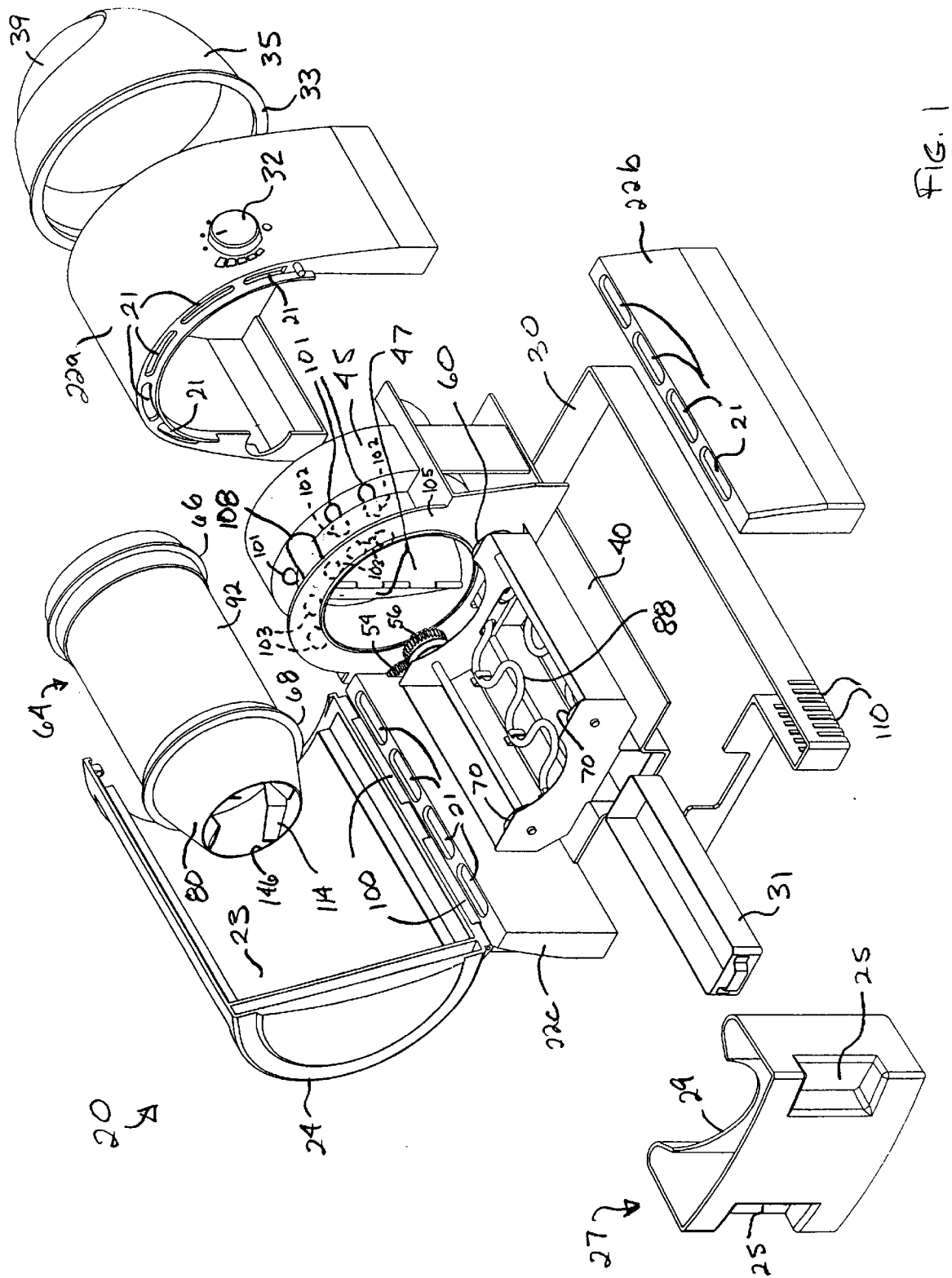
FIG. 1 is an exploded perspective view of the preferred apparatus for roasting coffee beans or other food of the present invention.
Figure 2:
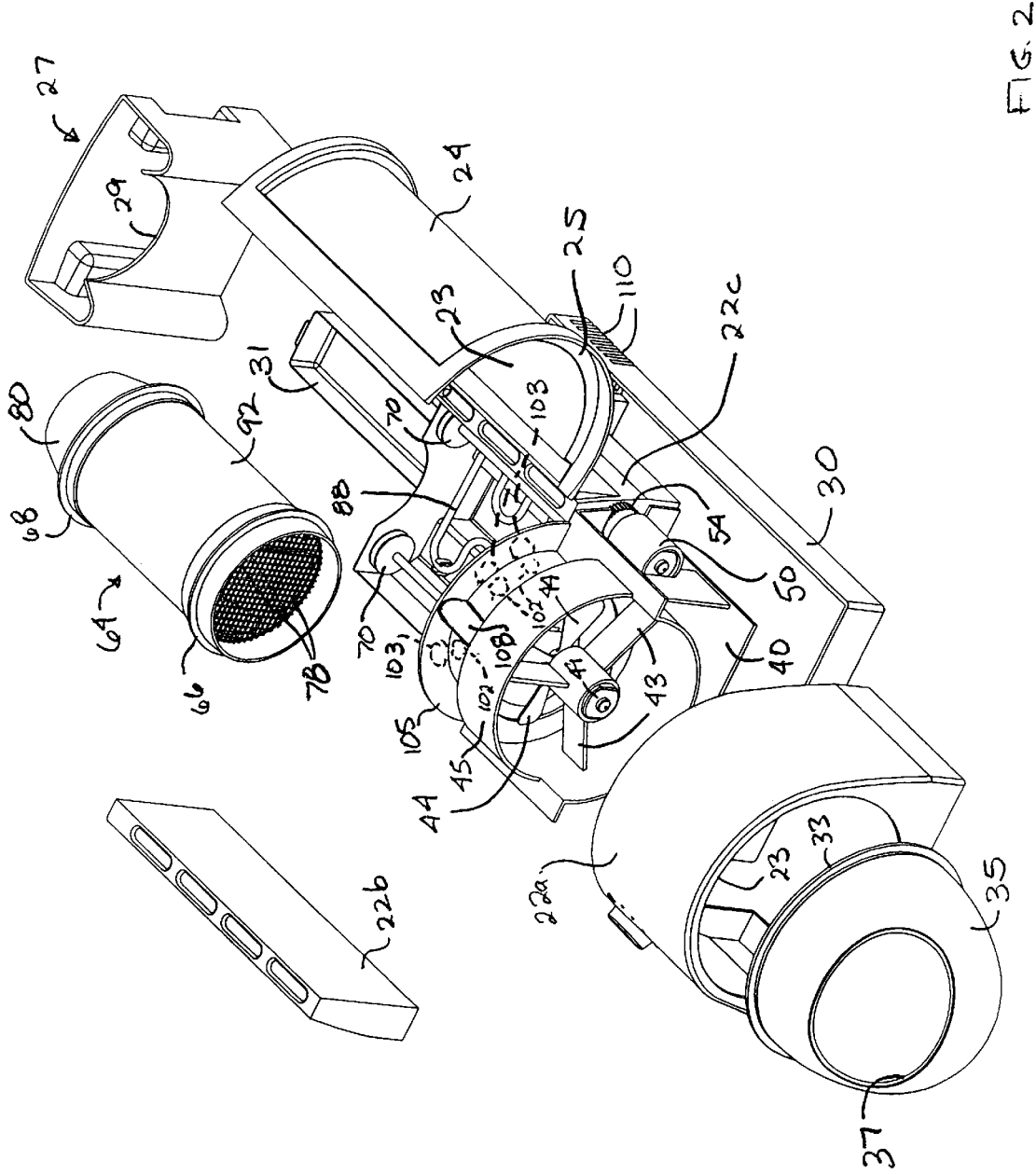
FIG. 2 is an exploded perspective view of the apparatus of FIG. 1 from the opposite direction.
Figure 3:
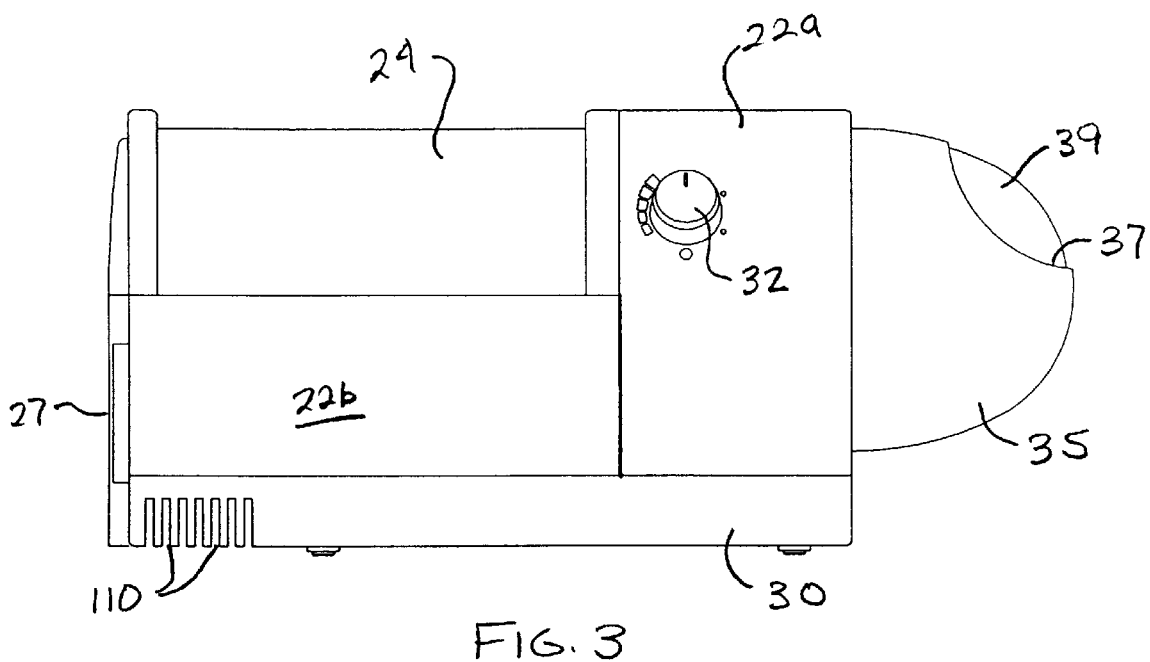
FIG. 3 is a side elevational view of the assembled apparatus of FIG. 1.
Figure 4:
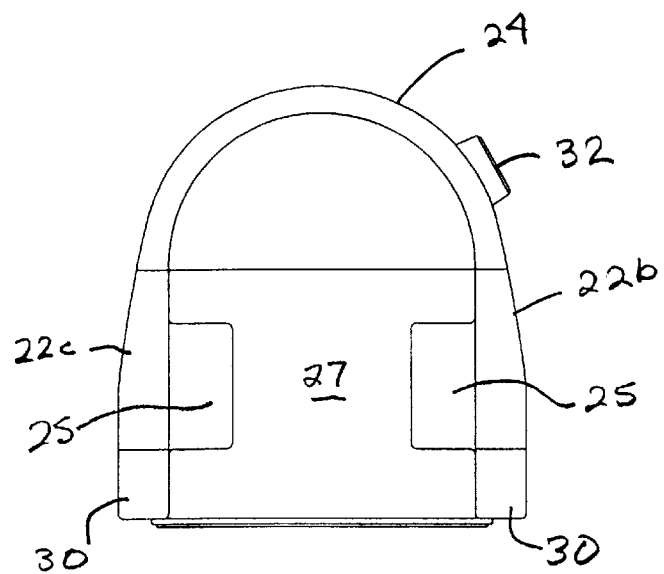
FIG. 4 is an end elevational view of the assembled apparatus of FIG. 1.
Figure 5:
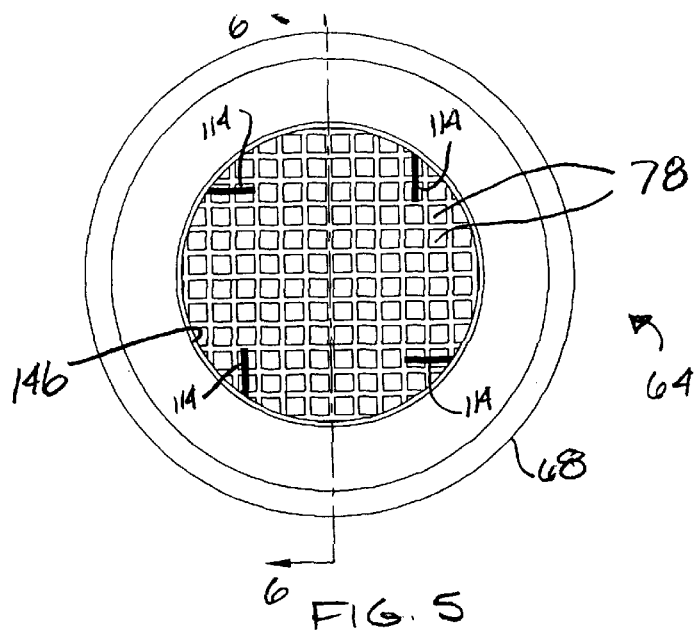
FIG. 5 is an end elevational view of the preferred roasting drum of the apparatus of FIG. 1.
Figure 6:
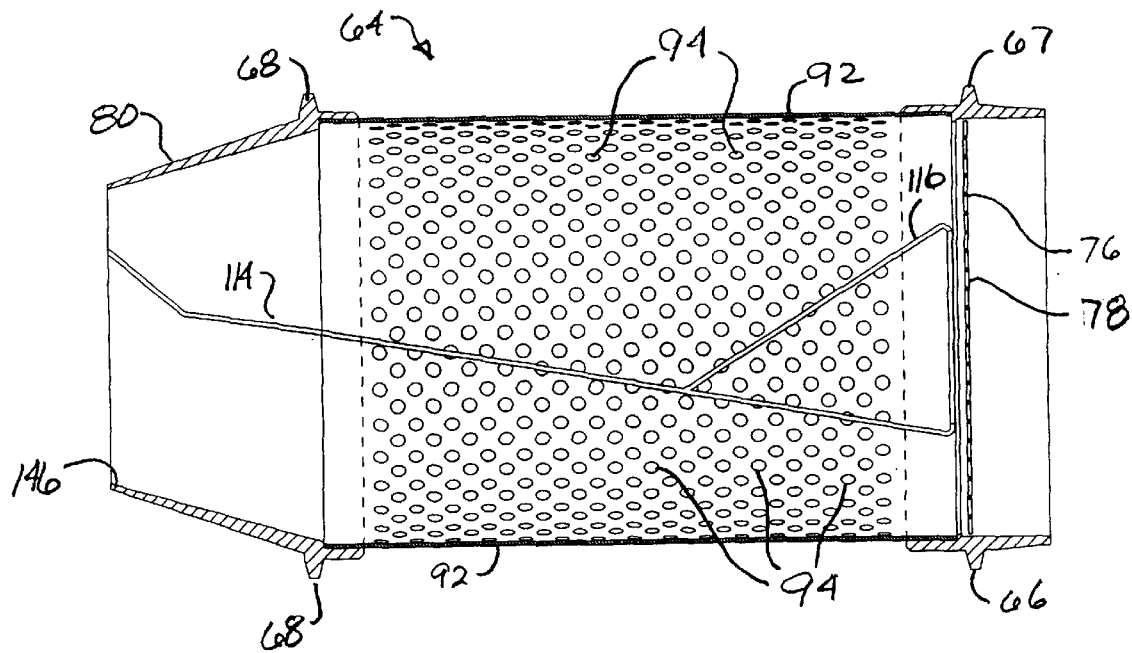
FIG. 6 is a side elevational view in cross-section of the roasting drum of FIG. 5 along line 6—6 of FIG. 5.

In describing the preferred embodiment of the present invention, reference will be made herein to FIGS. 1–6 of the drawings in which like numerals refer to like features of the invention. Features of the invention are not necessarily shown to scale in the drawings.

The preferred coffee bean roaster apparatus 20 of the present invention is depicted in FIGS. 1–4. In addition to roasting coffee beans, the apparatus of the present invention may be used to roast other food items, such as nuts, in a like manner as described herein. Coffee roaster 20 comprises an elongated base section 30 on which is mounted outer housing portions 22a, 22b and 22c. Housing portions 22a, 22b and 22c contain openings 21 for air flow completely through the housing portions. Base 30 contains air slots 110 which, along with openings 21 contribute to air flow through the device during the appropriate cycles as will explained further below. Housing end portion 22a rests on one end of base 30 and contains a circular opening 23 for receiving chaff collector 35. Housing side portions 22b and 22c rest upon base 30, and each abuts housing portion 22a along opposite sides of the roaster 20. Housing portion 22c contains on an upper edge thereof hinges 100 to which is mounted semi-cylindrical cover 24 which forms the upper portion of the remainder of the coffee roaster housing. An inner heat shield 23 below cover 24 creates an air channel or space 25 which mates with openings 21 for cooling air flow. A control knob 32 is provided to turn the device on and select the length of time for the roasting operation.

Chaff collector 35 has on an open end thereof lip 33 which is circular and corresponds to the opening 23 in collector housing end portion 22a, to removably mate and seal therewith. Chaff collector 35 also contains an air flow opening 37 in which is mounted a screen 39 to prevent the chaff from being discharged from the coffee roaster. Chaff collector 35 contains a plurality of openings in screen 39 which are sized sufficiently large to permit air to easily flow through the collector housing but small enough to catch substantially all of the chaff and not permit it to be blown back out of the device. Chaff collector 35 is rotatable within housing portion 22a so that exhaust from opening 37 may be directed in a desired direction.

At the opposite end from the chaff collector is the measuring/dispensing cup 27 for the coffee beans or other food items to be roasted. Cup 27 has a pair of recessed handles 25 for grasping and either inserting or removing the cup from the corresponding shaped opening in the collector between the ends of housing portions 22b and 22c, and below the end portion of cover 24. Cup 27 contains a semi circular lip 29 which mates with the corresponding opening 146 in roasting drum 64. When cover 24 is closed, cup 27 cannot be removed.

The roasting drum 64 is shown in FIGS. 1, 2, 5, and 6. The roasting drum holds the coffee beans and other items during the roasting operation as well as the subsequent cooling and chaff collecting operation. Drum 64 is cylindrical and perforated having on one end ring gear 66 and on the opposite end circumferential ring runner 68. Drum 64 is preferably made of a heat and corrosion resistant metal such as stainless steel and preferably has a capacity sufficient to hold from about 0.5 lb. (225 g) to 5 lb. (2.25 kg) of coffee beans or other food items to be roasted. Cylindrical drum wall 92 contains therein a plurality of openings 94, preferably extending over substantially the entire drum wall. At one end thereof, there is a wall 76 which likewise contains a plurality of openings 78 which cover substantially the entire drum end wall. The openings 78 and 94 are sufficiently large to permit passage of air therethrough but not so large so as to permit coffee beans or other items to pass through. At the opposite end in a conical, inwardly tapering end flange 80, ending in central opening 146, through which the coffee beans and other food items are loaded and ejected.

Within drum 64 there are provided in the preferred embodiment four internal helical vanes or baffles 114 which are secured to the interior of the drum and extend radially inward for a portion of the radius, in order to stir the beans or other food items during roasting. The number of vanes may vary, depending on the capacity and size of the drum and the type of food item to be roasted (see FIGS. 5 and 6). Vanes 114 extend longitudinally at an angle of, for example, 10 degrees to the longitudinal axis of the drum (FIG. 6) such that when the drum is rotated in one direction the beans tend to be forced back toward end 76 of the drum and away from mouth opening 146. To provide additional stirring action, there may optionally be provided an additional, oppositely angle set of radially extending inward vanes 116 which intersect with vanes 114 at an angle of, for example, −20 degrees to the longitudinal axis of the drum, at about the mid portion of the drum.

In order to rotate the drum during heating and cooling cycles as well as during the ejection process, there is provided a motor 50 which is mounted on base frame 40 which fits inside base 30. Motor 50 turns a motor gear 54 which in turn mates with and drives drive gear 56. Drive gear 56 mates with correspondingly formed gear teeth in ring gear 66. An idler gear 60 is provided to also mate with and support ring gear 66. At the opposite of drum 64 there is provided a pair of supporting guide wheels 70 which receive ring runner 68 to permit rotation of drum 64. A slideable drawer 31 is provided within a notched portion of base frame 40 beneath drum 64 to collect any particles which may fall from the drum, and may be removed for periodic cleaning as required.

Heat to the roasting drum 64 is provided by a serpentine electrical resistance heating element 88 known as a tubular heater or "cal-rod". Heating element 88 typically has 1000 watts thermal output, sufficient to heat the beans or other food items within the drum to a temperature of between about 350 and 500° F.

To permit cooling and removal of chaff from the beans or other items being roasted, there is provided a fan 44 mounted within fan housing 45 disposed between drum open end 146 and chaff collector 35. Fan 44 rotates about an axis coincident with the longitudinal axis of drum 64 and is driven by fan motor 49 supported by air flow vanes 43 within housing 45. A pair of doors 47 (FIG. 1) are mounted within door housing of flange 105 between the drum 64 and fan housing 45. These doors 47 are each semi-circular in configuration and are hinged along their respective diameter portions. A door actuator 108 comprising a motor or electronic actuator controls the opening and closing of doors 47. The doors are controlled by actuator 108 so that they normally remain closed, but when the beans or other food items are sufficiently roasted, are opened by the actuator in the direction of the fan 44 to permit air flow directly through and from drum 64 through doors 47, fan 44 and into chaff collector housing 35.

Air vents 101 and 102 may be optionally provided around the circumference of fan housing 45, and air vents 103 may be provide around the circumference of door housing 105 in order to provide additional air flow when fan 44 is operating. Preferably, fan 44 operates continuously during roasting and cooling cycles. During roasting, when doors 47 are in the closed position, cooling air is moved by fan 44 all around, but not through, drum 64. The air flows around drum 64 through air slots 110 in the base, through openings 21 in housing portions 22a, 22b and 22c, through channel 25 in cover 24, through air vents 103 around door housing 105, and though air vents 101 and 102 around the fan housing, all of which are is communication for air flow. Such air flow during roasting cools the outer portions of the unit and removes any smoke which may escape from the drum region through chaff collector opening 37.

During operation of the coffee roaster, the cover 24 of roasting apparatus 20 is opened and drum 64 is removed and placed upright with end portion 76 down and flange 80 up so that the coffee beans or other items to be roasted can be loaded into drum opening 146. Drum 64 is then placed back inside the coffee roaster apparatus such that ring gear 66 engages gears 56 and 60 and ring runner 68 engages guide wheels 70. After closing cover 24, control knob 32 is activated to turn on a timer and heating element 88 to heat the drum and the surrounding air. Simultaneously, motor 50 is turned on to cause drum 64 to rotate in one direction by means of gears 54 and 56 to heat the beans evenly, actuator 108 is operated to close doors 47, and fan 44 is turned on to flow cooling air around, but not through, drum 64. During roasting, the internal helical vanes or baffles 114, and optionally 116, stir the beans in a manner that they are kept away from opening 146 because of the horizontal orientation of drum 64.

After the beans have been held at a sufficiently high temperature for a time sufficient to roast them thoroughly, without any additional forced air flow beyond normal convection currents through and in the vicinity of the drum, heating element 88 is deactivated and actuator 108 is operated so as to cause doors 47 to open and permit a flow of ambient, cooling air enter through vents 110 and into drum 64 and the contents thereof through drum openings 78 and 94. The cooler ambient air then travels through the opening 146 in drum 64, open doors 47, fan 44 and out through the opening 37 and chaff collector 35.

Normally, motor 50 will continue to rotate drum in the same direction as during roasting so that the frangible coating on the now roasted beans breaks off by the tumbling action imparted by the drum and the loose chaff can then be blown out through openings 78 and end wall 76 of drum 64 opposite the loading end opening 146. The semi-spherical configuration of chaff collector 35 and the sufficiently small openings in screen 39 permit chaff to be collected therein without being discharged from the coffee roaster and into the surrounding environment. Fan 44 continues to operate until the drum 64 cools to a sufficient temperature, after which the fan is turned off.

Even before drum 64 is sufficiently cooled for handling, the direction of rotation may be reversed by motor 50 so that the internal vanes 114 cause the beans or other items within the drum to be pushed toward drum opening 146 and ejected into cup 27. This may be accomplished automatically or be separate engagement of a control switch which may be activated after roasting is completed. Cup 27 may be grasped by the user by means of recessed portions 25 and removed entirely from coffee roaster 20. At the opposite end, chaff collector 35 may be removed from the coffee roaster and the chaff collected therein may be disposed of.

Thus the present invention is seen to provide and improved roasting apparatus for use in the home in which the coffee beans or other items may be easily loaded, roasted and dispensed, which may be easily cleaned and permits chaff collection which does not interfere with dispensing of the roasted coffee beans at the opposite end of the device. The present invention provides an apparatus and method in which air flow is particularly controlled to optimize the heating/cooling process while roasting coffee beans, and optimizes the path and location of chaff collection in a roasting apparatus. The apparatus which may be used in the home environment to roast small (0.5 to 2 lb.) quantities of coffee beans or other food items.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A roasting apparatus for coffee beans and other food comprising:
    a housing;
    a drum on said housing rotatable about an axis and having an opening on a first end thereof for receiving and discharging coffee beans or other food desired to be roasted and a plurality of openings on a second end opposite said first end of size sufficient to pass air and insufficient to pass said coffee beans or other food;
    a heater in said housing capable of heating said drum to roast said coffee beans or other food;
    a fan adapted to move air through said first and second ends of said drum; and
    a door between said fan and said drum movable between a closed position substantially blocking passage of free flow of air through said drum and an open position permitting free flow of said air, wherein said door is adapted to be in a closed position during roasting of said coffee beans or other food and in an open position once said coffee beans or other food are sufficiently roasted.

2. The roasting apparatus of claim 1 wherein the drum axis is horizontal.

3. The roasting apparatus of claim I further including a chaff collector secured to said housing at an end opposite the drum first end, said collector having a plurality of openings of size sufficient to pass air and insufficient to pass chaff from said coffee beans or other food.

4. The roasting apparatus of claim 3 wherein once said coffee beans or other food are sufficiently roasted, said fan is adapted to move air through the opening in said first end of said drum, cause chaff to be removed from the roasted beans or other food and carried with said air through the openings in said second end of said drum, and cause said chaff to be collected within said chaff collector as said air passes through the openings therein.

5. The roasting apparatus of claim 4 wherein the drum axis is horizontal and said air and chaff are moved in a substantially horizontal direction through said apparatus.

6. The roasting apparatus of claim 3 wherein said chaff collector is rotatably secured to said housing to vary direction of air passing through said openings therein.

7. The roasting apparatus of claim 3 wherein said chaff collector is detachably secured to said housing for removal and cleaning.

8. The roasting apparatus of claim 1 further including a collection cup removably secured on said housing proximate said first end of said drum, said collection cup having a lip conforming to the configuration of the opening on said first end of said drum.

9. The roasting apparatus of claim 1 including a plurality of doors between said fan and said drum.

10. The roasting apparatus of claim 1 including a pair of doors between said fan and said drum, said doors being pivotally mounted on a common hinge for movement between the closed and open positions.

11. The roasting apparatus of claim 1 including a door actuator adapted to retain said door in said closed position during roasting and move said door to said open position once said coffee beans or other food are sufficiently roasted.

12. The roasting apparatus of claim 11 further including a removable drawer below said drum for collecting particles removed from said coffee beans or other food during roasting.

13. A roasting apparatus for coffee beans and other food comprising:

a housing;

a drum on said housing rotatable about an axis and having an opening on a first end thereof for receiving and discharging coffee beans or other food desired to be roasted and a plurality of openings on a second end opposite said first end of size sufficient to pass air and insufficient to pass said coffee beans or other food;

a heater in said housing capable of heating said drum to roast said coffee beans or other food; and a chaff collector secured to said housing at an end opposite the drum first end, said collector having a plurality of openings of size sufficient to pass air and insufficient to pass chaff from said coffee beans or other food.

14. The roasting apparatus of claim 13 further including a fan adapted to move air through said first and second ends of said drum to cause chaff to be removed from said coffee beans or other food after roasting and collected in said chaff collector.

15. The roasting apparatus of claim 13 further including a door and door actuator adjacent the first end of said drum movable between a closed position substantially blocking passage of free flow of air to said drum and an open position permitting free flow of said air, wherein said door is adapted to be in a closed position during roasting of said coffee beans or other food and in an open position once said coffee beans or other food are sufficiently roasted.

16. The roasting apparatus of claim 13 wherein said chaff collector is rotatably secured to said housing to vary direction of air passing through said openings therein.

17. The roasting apparatus of claim 13 wherein said chaff collector is detachably secured to said housing for removal and cleaning.

18. The roasting apparatus of claim 13 wherein the drum axis is horizontal and said air and chaff are moved in a substantially horizontal direction through said apparatus.

19. The roasting apparatus of claim 13 further including a removable drawer below said drum for collecting particles removed from said coffee beans or other food during roasting.

20. The roasting apparatus of claim 13 wherein said chaff collector includes a screen having said plurality of openings.

21. A method of roasting coffee beans or other food comprising:

providing a drum rotatable about an axis and having an opening on a first end thereof for receiving and discharging coffee beans or other food desired to be roasted and a plurality of openings on a second end opposite said first end of size sufficient to pass air and insufficient to pass said coffee beans or other food;

placing coffee beans or other food to be roasted in said drum;

applying heat to said drum while restricting flow of air through said drum, except for any natural convection, to cause said coffee beans or other food to be roasted; and after said coffee beans or other food has been sufficiently roasted, flowing air through said drum to cool said coffee beans or other food and cause chaff to be removed therefrom.

22. The method of claim 21 wherein the cooling air is flowed through the opening on the drum first end, causing chaff to be removed from the roasted beans or other food and carried with said air through the openings in said second end of said drum, and thereafter collecting said chaff.

23. The method of claim 21 wherein cooling air is directed around said drum while restricting flow of air through said drum during roasting.

* * * * *

UNITED STATES PATENT AND TRADEMARK OFFICE
CERTIFICATE OF CORRECTION

PATENT NO. : 6,036,988
DATED : March 14, 2000
INVENTOR(S) : Lemme et al.

It is certified that error appears in the above-identified patent and that said Letters Patent is hereby corrected as shown below:

On the Cover Page   In the Abstract

Line 18 of the abstract, delete "through-the" and substitute therefore -- through the --

In the Specification

Col. 1, line 26, after "found to" insert -- be --

Col. 1, line 22, delete "he" and substitute therefore -- the --

Col. 2, line 31, delete "the" and substitute therefore -- there --

Col. 2, line 59, delete "the" and substitute therefore -- The --

Col. 3, line 28, after "will" insert -- be --

Col. 4, line 13, delete "in" and substitute therefore -- is --

Col. 5, line 7, delete "provide" and substitute therefore -- provided --

Signed and Sealed this

Twenty-seventh Day of March, 2001

Attest:

NICHOLAS P. GODICI

Attesting Officer

Acting Director of the United States Patent and Trademark Office